(12) United States Patent
Sano

(10) Patent No.: US 7,092,319 B2
(45) Date of Patent: Aug. 15, 2006

(54) POWER CALIBRATION METHOD AND APPARATUS FOR OPTICAL DISC

(75) Inventor: Hideo Sano, Tokyo (JP)

(73) Assignee: NEC Corporation, Tokyo (JP)

( * ) Notice: Subject to any disclaimer, the term of this patent is extended or adjusted under 35 U.S.C. 154(b) by 557 days.

(21) Appl. No.: 10/624,613

(22) Filed: Jul. 23, 2003

(65) Prior Publication Data

US 2004/0120234 A1    Jun. 24, 2004

(30) Foreign Application Priority Data

Jul. 31, 2002   (JP)   ............................. 2002-222810

(51) Int. Cl.
*G11B 7/125*   (2006.01)
(52) U.S. Cl. .............. 369/13.27; 369/47.53; 369/47.52; 369/116
(58) Field of Classification Search ............ None
See application file for complete search history.

(56) References Cited

U.S. PATENT DOCUMENTS 6,738,329 B1 * 5/2004 Hsiao ................ 369/47.53
6,963,525 B1 * 11/2005 Honda ................ 369/47.53
2001/0007546 A1 * 7/2001 Lee et al. ........... 369/47.53

FOREIGN PATENT DOCUMENTS

| JP | 7-287847 | 10/1995 |
| JP | 9-212866 | 8/1997 |
| JP | 3059334 | 3/1999 |
| JP | 11-353686 | 12/1999 |
| JP | 2000-163749 | 6/2000 |
| JP | 2000311341 A * | 11/2000 |

* cited by examiner

*Primary Examiner*—William Korzuch
*Assistant Examiner*—Joseph Haley
(74) *Attorney, Agent, or Firm*—Young & Thompson

(57) ABSTRACT

A power calibration apparatus identifies a calibration area divided by an EFM frame unit on an optical disc and controls writing by a writing means. According to read out information for test writing written in the optical disc, a first writing power is calculated. By setting the first recording power as an initial value and changing the first recording power by a dense degree through steps corresponding to the number of the calibration areas divided by the EFM frame unit, the apparatus urges writing by the writing means. According to the read out information for the test writing written in the optical disc, a second writing power is calculated.

21 Claims, 9 Drawing Sheets

POWER CALIBRATION METHOD AND APPARATUS FOR OPTICAL DISC

BACKGROUND OF THE INVENTION

1. Field of the Invention

The present invention relates to a power calibration method and a power calibration apparatus which determine the optimum writing power through writing information for test writing by emitting a laser light to a power calibration area on an optical disc, and reading the written information.

2. Description of the Related Art

When writing information into a recordable (write-once) optical disc (CD-R), the writing power is optimized by performing "test writing" into the power calibration area (hereinafter referred to as "PCA") beforehand. The process of optimizing the writing power will now be described with reference to FIGS. 8 and 9.

AS shown in FIG. 8, the PCA 81 is divided into a test area 82 and a count area 83. The count area 83 is composed of one hundred count frames (CF01 to CF100), and the test area 82 is composed of one hundred partitions 84 (TA01 to TA100). A partition 84, which is composed of fifteen test frames (TF01 to TF15), is an area used for one power calibration. In prior art, as shown in FIG. 9, the optimization is performed by: writing a predetermined information into each of the fifteen test frames (TF01 to TF15) used for one power calibration, or in one partition 84, through changing the writing power in steps respectively, that is, in fifteen steps total; reading the written information; based on the reproducing signals, selecting the writing power in which the writing condition is the best; and writing information in accordance with the selected writing power.

In Japan as well as in other countries, enormous kinds of optical discs exist, and the recording sensitivity of these optical discs varies. Therefore, it may be difficult to determine the optimum writing power to all those having low recording sensitivity to those having high recording sensitivity from the result of writing and reading information, using the fifteen test frames.

Accordingly, in the prior art, there are some cases which perform the power calibration using a plurality of partitions 84 so as to improve the precision in determining the optimum writing power.

In order to improve the precision in determining the optimum writing power, it is necessary to perform the power calibration for multiple number of times using a plurality of partitions 84 as described above. However, since the PCA 81 only reserves for one hundred time use (that is, having one hundred partitions 84 only), there may be a case that the PCA 81 is run out and the optical disc becomes out of use during a process of writing a plurality of sessions or packet writing.

In the Japanese Patent Laid-Open No.7-34052 and No.10-161734, a technique for saving the PCA is disclosed, in which the power calibration is performed by further dividing each fifteen frame having the smallest area into a plurality of areas.

Although these examples can save the PCA, one of the fifteen frames with the smallest area is further divided into fifteen frames in either case, and the writing power is determined from the result of writing and reading information using the divided fifteen frames, causing only a small number of samples for determining the writing power. Consequently, an error in the optimum writing power may be large.

SUMMARY OF THE INVENTION

It is therefore an object of the present invention to provide a power calibration method and a power calibration apparatus, which are capable of determining the optimum writing power to recording media having various recording sensitivity, using the smallest area of PCA.

To achieve the aforementioned object, a power calibration apparatus for an optical disc according to the present invention comprises: a writing means for writing information for the test writing by emitting a laser light to the power calibration area on an optical disc; a reading means for reading the information for the test writing written in the optical disc; a first calibration means for controlling writing by the writing means through changing in steps the writing power of the laser light for writing the information for the test writing into the optical disc, setting the stepwise changing amount to a non-dense degree, and identifying a calibration area which, among calibration areas divided by a non-dense unit on the optical disc, is divided by a dense unit instead of the non-dense unit; a first writing power calculation means for reading the information for the test writing written in the optical disc under the control of the first calibration means, and calculating a first writing power in accordance with read out information for the test writing; a second calibration means for setting, to the writing power of the laser light for writing the information for the test writing into the optical disc, the first writing power as an initial value, and by changing the first writing power by a dense degree through steps corresponding in number to that of the calibration areas divided by the dense unit, urging the writing means to write corresponding to the steps in number; and a second writing power calculation means for reading the information for the test writing written in the optical disc under the control of the second calibration means, and calculating a second writing power in accordance with the information for the test writing of the sample numbers corresponding to the calibration areas in number. Here, the non-dense unit is an Atip unit and the dense unit is an EFM frame unit.

The power calibration apparatus for an optical disc of the present invention writes by the writing means information for the test writing by emitting a laser light to the power calibration area on an optical disc, while reads by the reading means the information for the test writing written in the optical disc.

When performing the test writing, the first calibration means changes in steps the writing power of the laser light for writing the information for the test writing into the optical disc, sets the stepwise changing amount to a non-dense degree, and identifies a calibration area which, among calibration areas divided by an Atip unit on the optical disc, is divided by an EFM frame unit instead of the Atip unit, to thereby controls writing by the writing means. Then, the first writing power calculation means reads the information for the test writing written in the optical disc under the control of the first calibration means, and calculates a first writing power in accordance with read out information for the test writing.

Next, the second calibration means sets, to the writing power of the laser light for writing the information for the test writing into the optical disc, the first writing power as an initial value, and by changing the first writing power by a dense degree through steps corresponding in number to that of the calibration areas divided by the EFM frame unit, urging the writing means to write corresponding to the steps specified in number. Then, the second writing power calculation means reads the information for the test writing written in the optical disc under the control of the second calibration means, and calculates a second writing power in accordance with the information for the test writing of the sample numbers corresponding to the calibration areas in number.

The first writing power calculation means and the second writing power calculation means calculate the writing power in accordance with the β value, in which the maximum value and the minimum value of signals reproducing the information for the test writing are assumed to be R1 and R2, respectively. It should be noted here that an equation of β=(R1+R2)/(R1−R2) is satisfied.

The second writing power calculation means outputs the second writing power by performing a true/false verification through a β verification process. Here, the second writing power calculation means verifies true/false of the second writing power by comparing the β value of the writing power set as a target with the β value output from the second writing power calculation means. The β value is obtained from a formula of (R1+R2)/(R1−R2), in which the maximum value and the minimum value of the signal reproducing the information for the test writing are assumed to be R1 and R2, respectively.

Further, the second calibration means may urge the writing means to write repeatedly for a plurality of times, and in accordance with the average value obtained therein, the second writing power calculation means calculates the second writing power.

The first writing power calculation means may output the first writing power by performing the true/false verification through the β verification. In this case, the first writing power calculation means may verify true/false of the first writing power by comparing the β value of the writing power set as a target with the β value of the writing power output from the first writing power calculation means. The β value is obtained from a formula of (R1+R2)/(R1−R2), in which the maximum value and the minimum value of the signal reproducing the information for the test writing are assumed to be R1 and R2, respectively.

As described above, the present invention is capable of determining the optimum writing power for recording media having various recording sensitivity, by using the smallest area of the PCA.

PREFERRED EMBODIMENT OF THE PRESENT INVENTION

Figure 2:
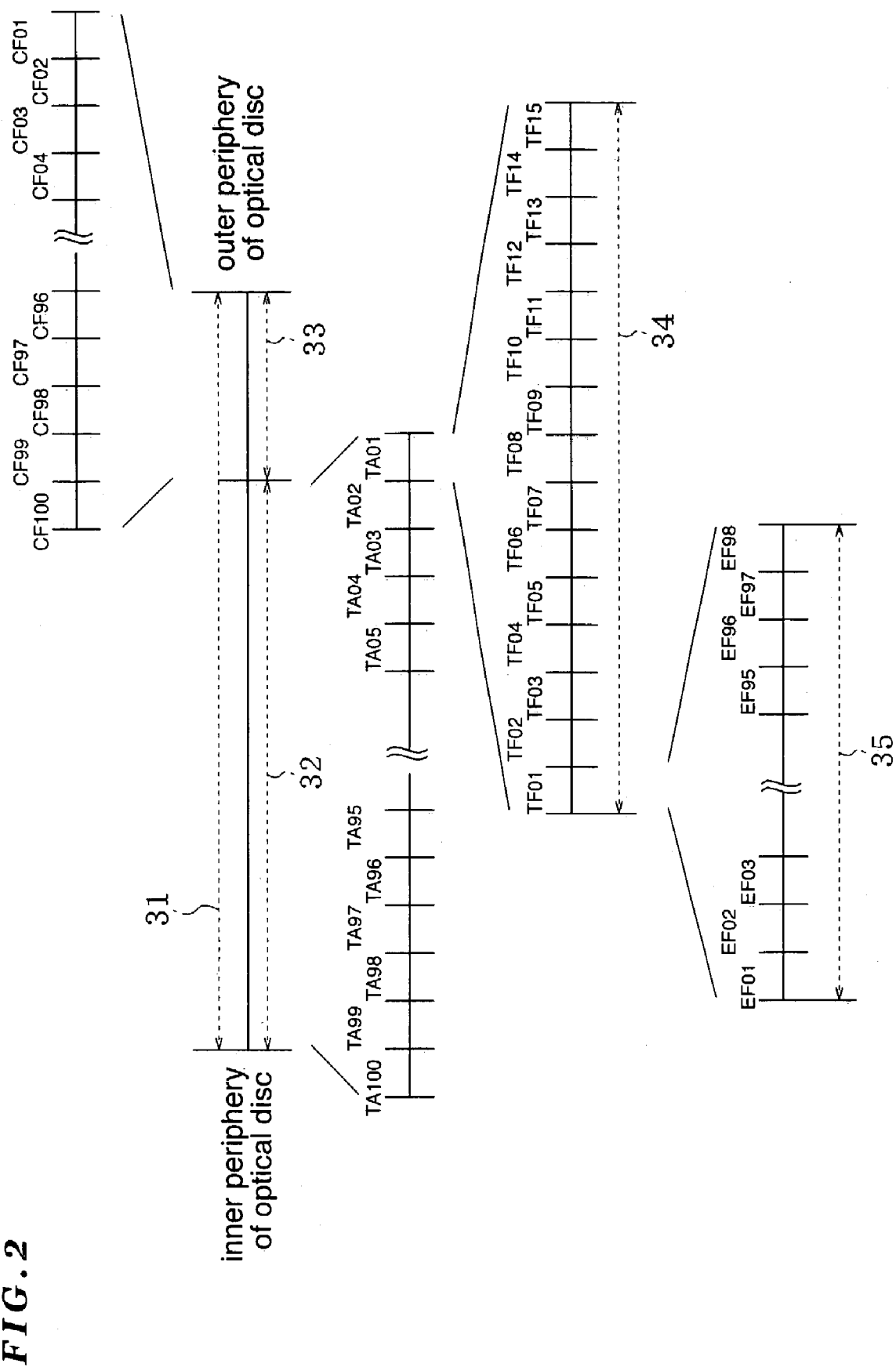
FIG. 2 is a diagram illustrating the structure of the PCA used in the power calibration apparatus shown in FIG. 1.

An embodiment of the present invention will be described below with reference to the accompanying Figures. In the following description, the present invention is described with a CD-R, which is a recordable (write-once) optical disc, by way of an example of an optical disc. As shown in FIG. 2, on the CD-R used in the present invention, there is a power calibration area (PCA) 31 in which test writing is performed, comprising a test area 32 for performing test writing and a count area 33. The count area 33 is divided into one hundred frames (CF01 to CF100) and the test area 32 is also divided into one hundred frames (TA01 to TA100). It should be noted here that a compact disc (CD) uses an Atip unit as the smallest unit for dividing an area into frames, and the PCA of CD is so divided that fifteen Atip frames constitute one PCA. In accordance with this method, each frame (TA01 to TA100) of the test area 32 is divided into fifteen Atip frames (TF01 to TF15). Therefore, the test area 32 has the number of areas equal to fifteen frames multiplied by one hundred. An area with fifteen frames (TF01 to TF15) in the test area 32 is a calibration area 34, that is, the frames in which a calibration (test writing) is performed. In the prior art described above, each of these frames (TF01 to TF15) is divided into fifteen Atip frames using the Atip unit as the smallest unit in CD. In this case, the test writing is performed using the fifteen Atip frames, causing only a small number of samples for calculating the writing power. As a consequence, an error in the writing power may be large.

In the present invention, a unit of EFM frame is used instead of the conventional Atip unit. A frame of the calibration area 34 is divided into ninety-eight EFM frames 35, which frames are used for performing test writing of the calibration.

The present invention uses one calibration area divided into ninety-eight EFM frames as described above, performs test writing by switching the changing amount of the writing power from non-dense to dense degree, reads the written information, and obtains a plurality of samples, for example, one thousand four hundreds and seventy (fifteen multiplied by ninety-eight) samples instead of the conventional fifteen samples, to thereby calculate the optimum writing power regardless of the recording sensitivity.

Figure 6:
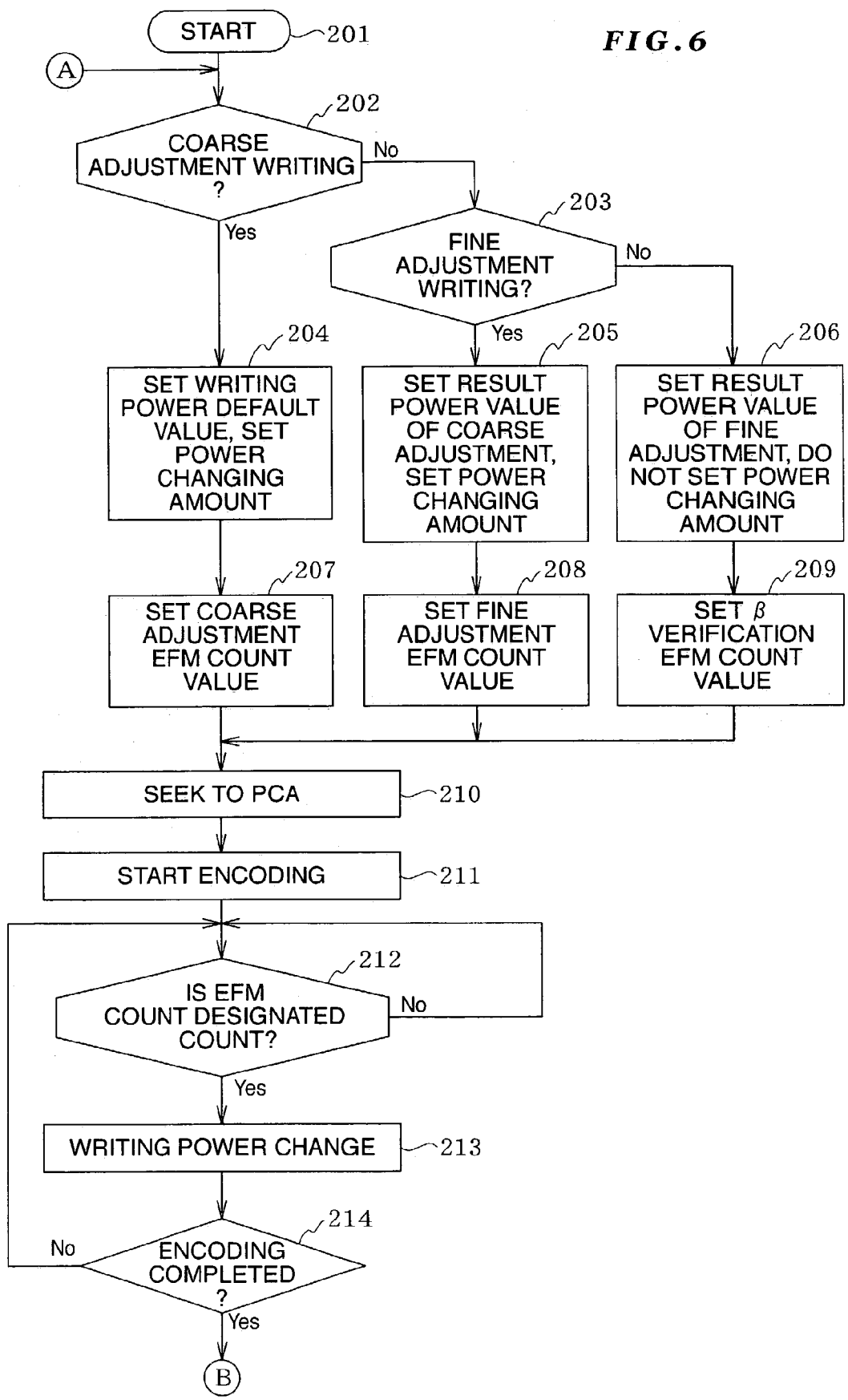
FIG. 6 is a flowchart showing an operation (a first operation) of the power calibration apparatus shown in FIG. 1.
Figure 7:
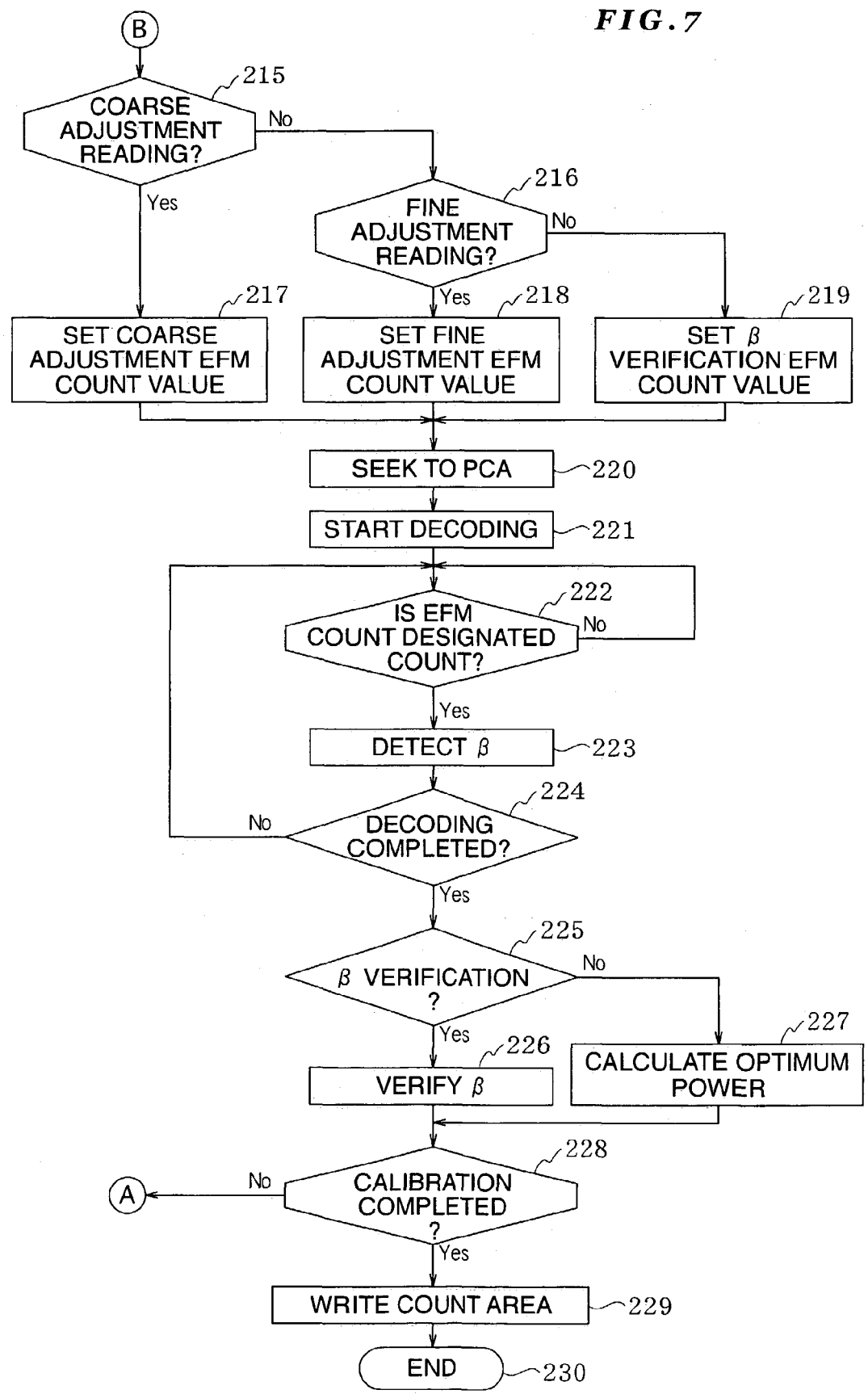
FIG. 7 is a flowchart showing an operation (a second operation) of the power calibration apparatus shown in FIG. 1.
Figure 8:
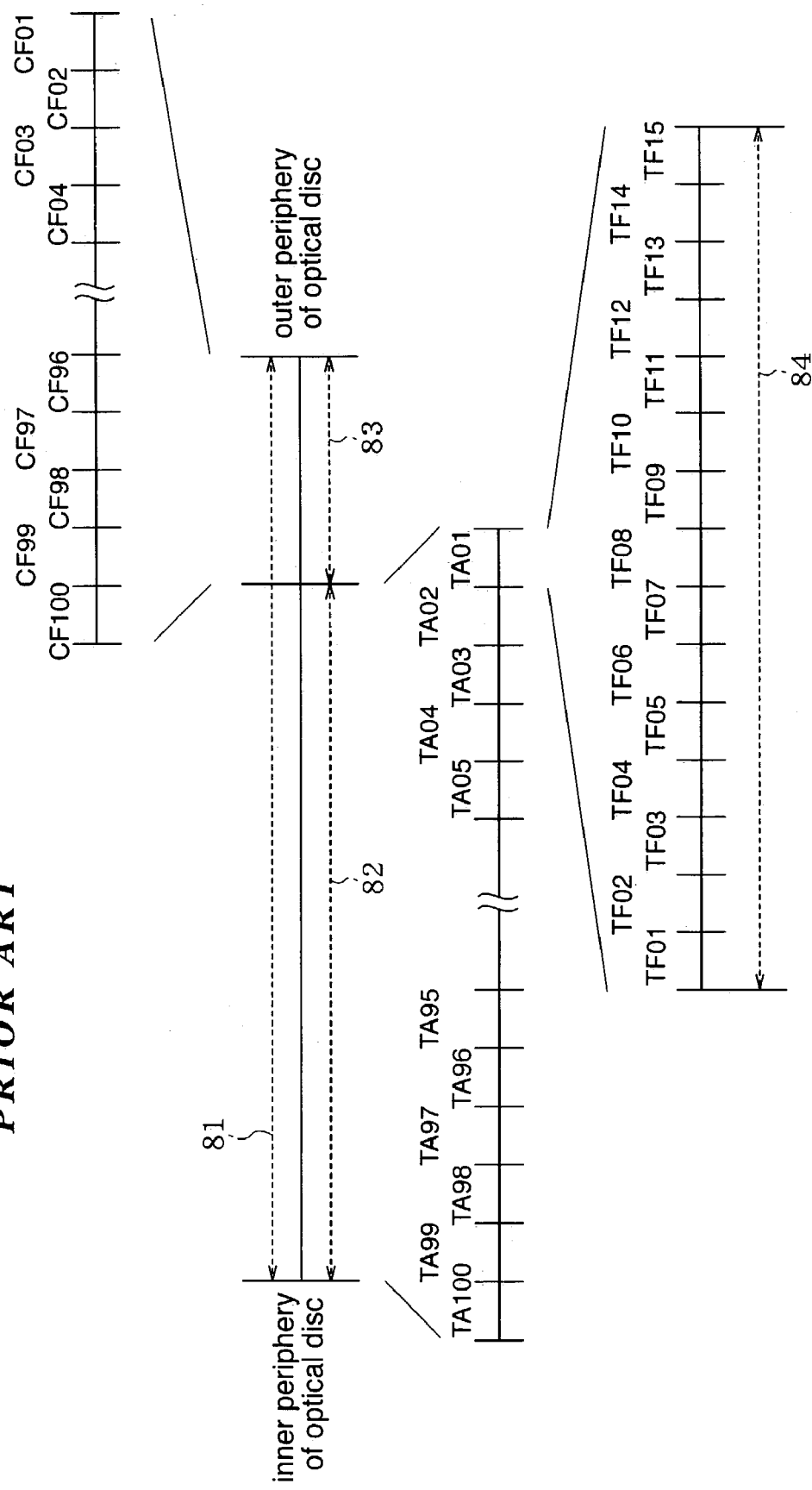
FIG. 8 is diagram illustrating the structure of the PCA used in a conventional power calibration apparatus.

Specifically describing, in the present invention as shown in FIGS. 6 and 7, a power calibration apparatus first changes in steps the writing power of the laser light, which is for writing information for the test writing into the power calibration area on the optical disc, sets the stepwise changing amount to a non-dense degree, identifies a calibration area which, among calibration areas divided by a non-dense unit on the optical disc, is divided by a dense unit instead of the non-dense unit, and controls writing of the information for the test writing written with the writing power (a first calibration step). It should be noted that a case of using an Atip unit as the non-dense unit and an EFM frame unit as the dense unit is described below. However, the non-dense unit and the dense unit are not limited to these units.

Then, the apparatus reads the information for the test writing written in the optical disc, and calculates a first writing power in accordance with the read out information for the test writing (a first writing power calculation step).

After the first writing power is calculated, the apparatus sets the first writing power as an initial value to the writing power of the laser light for writing the information for the test writing into the optical disc, and by changing the first writing power through steps corresponding in number to that of the calibration areas divided by the EFM frame unit, urges writing with the first writing power corresponding to the steps specified in number (a second calibration step).

When the process of the second calibration step is completed, the apparatus reads the information for the test writing written in the optical disc with the first writing power, and calculates a second writing power in accordance with the information for the test writing of the sample number corresponding to the number of the calibration areas (a second writing power calculation step).

After the second writing power is calculated, the apparatus performs test writing into the optical disc with the second writing power and reads the written test writing, then verifies true/false of the second writing power (a verifying step).

In the present invention described above, the process of power calibration is performed by the first calibration step, the first writing power calculation step, the second calibration step, the second writing power calculation step, and the verifying step in this order. However, the verifying step may be performed between the first writing power calculation step and the second calibration step.

That is, in the present invention, the apparatus first changes in steps the writing power of the laser light for writing information for the test writing, sets the stepwise changing amount to a non-dense degree, identifies a calibration area which, among calibration areas divided by an Atip unit on the optical disc, is divided by an EFM frame unit instead of the Atip unit, is identified, and controls writing of the information for the test writing written with the writing power (a first calibration step).

Then, the apparatus reads the information for the test writing written in the optical disc, and calculates a first writing power in accordance with the read out information for the test writing (a first writing power calculation step).

After the first writing power is calculated, the apparatus performs test writing into the optical disc with the first writing power and reads the written test writing, then verifies true/false of the first writing power (a verifying step).

Next, the apparatus sets the first writing power verified as true in the verifying step as the initial value to the writing power of the laser light for writing the information for the test writing into the optical disc, and by changing the first writing power by a dense degree through steps corresponding in number to that of the calibration areas divided by the EFM frame unit, urges the first writing power to write corresponding to the steps in number (a second calibration step).

Then the apparatus reads the information for the test writing written in the optical disc with the first writing power, and calculates a second writing power in accordance with the information for the test writing of the sample number corresponding to the number of the calibration areas (a second writing power calculation step).

After the second writing power is calculated, the apparatus performs test writing into the optical disc with the second writing power and reads the test writing written into the optical disc, then verifies true/false of the second writing power (a verifying step).

Figure 1:
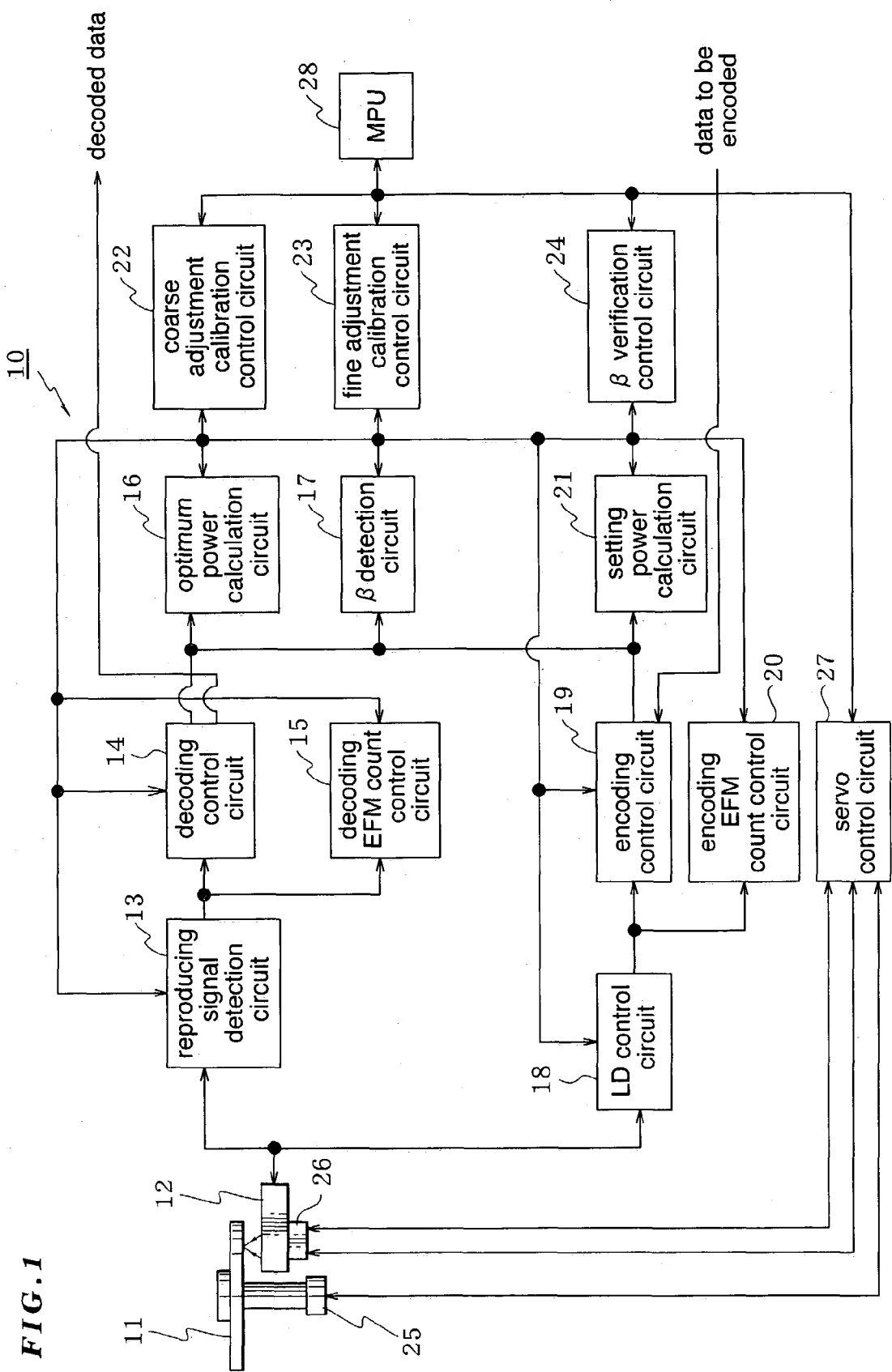
FIG. 1 is a block diagram showing a first embodiment of a power calibration apparatus according to the present invention.

As shown in FIG. 1, an apparatus for performing a power calibration method for an optical disc according to the present invention comprises, as its basic structure, a writing means for writing information for test writing by emitting a laser light to the power calibration area on the optical disc, and a reading means for reading the information for the test writing written in the disc.

When performing the test writing, a first calibration means changes in steps a writing power of the laser light for writing the information for the test writing into the optical disc, sets a stepwise changing amount to a non-dense degree, identifies a calibration area which, among calibration areas divided by an Atip unit on the optical disc, is divided by an EFM frame unit instead of the Atip unit, and controls writing by the writing means.

A first writing power calculation means reads the information for the test writing written in the optical disc under the control of the first calibration means, and calculates a first writing power in accordance with the read out information for the test writing.

A second calibration means sets, to the writing power of the laser light for writing the information for the test writing into the optical disc, the first writing power as the initial value, and by changing the first writing power through steps specified in number to determine the writing power of the laser light, urging the writing means to write corresponding to the specified number of steps.

A second writing power calculation means reads the information for the test writing written in the optical disc under the control of the second calibration means, and calculates a second writing power in accordance with the readout information for the test writing of the specified number.

As shown in FIG. 1, the writing means and the reading means of the power calibration apparatus 10 according to the present invention comprise a light pickup 12, a spindle motor 25, and a servo control circuit 27.

The first calibration means of the power calibration apparatus 10 according to the present invention comprises, a coarse adjustment calibration control circuit 22, a setting power calculation circuit 21, a β detection circuit 17, a β verification control circuit 24, an LD control circuit 18, an encoding control circuit 19, and an encoding EFM count control circuit 20.

The first writing power calculation means of the power calibration apparatus 10 according to the present invention comprises, a reproducing signal detection circuit 13, a decoding control circuit 14, a decoding EFM count control circuit 15, and an optimum power calculation circuit 16.

The second calibration means of the power calibration apparatus 10 according to the present invention comprises, a fine adjustment calibration control circuit 23, a setting power calculation circuit 21, a β detection circuit 17, a β verification control circuit 24, an LD control circuit 18, an encoding control circuit 19, and an encoding EFM count control circuit 20.

Further, the MPU 28 of the power calibration apparatus 10 according to the present invention generally controls the above components.

The second writing power calculation means of the power calibration apparatus 10 according to the present invention comprises, a reproducing signal detection circuit 13, a decoding control circuit 14, a decoding EFM count control circuit 15, and an optimum power calculation circuit 16.

The power calibration apparatus for an optical disc according to the present invention writes, by the writing means, the information for the test writing by emitting the laser light to the power calibration area of the optical disc, and reads, by the reading means, the information for the test writing written in the disc.

When performing the test writing, the first calibration means changes in steps the writing power of the laser light for writing the information for the test writing into the optical disc, and sets the stepwise changing amount to a non-dense degree to thereby control writing by the writing means. Then, the first writing power calculation means reads the information for the test writing written in the optical disc under the control of the first calibration means, and calculates the first writing power in accordance with the read out information for the test writing.

The second calibration means sets, to the writing power of the laser light for writing the information for the test writing into the optical disc, the first writing power as the initial value, and by changing the first writing power by a dense degree through steps corresponding in number to that of the calibration areas divided by the EFM frame unit, urging the writing means to write corresponding to the steps in number. Then, the second, writing power calculation means reads the information for the test writing written in the optical disc under the control of the second calibration means, and calculates the second writing power in accordance with the information for the test writing of the sample number corresponding to the number of the calibration areas.

The first and the second writing power calculation means calculate the writing power in accordance with the $\beta$ value in which the maximum value and the minimum value of the signals reproducing the information for the test writing are assumed to be R1 and R2, respectively. Here, an equation of $\beta=(R1+R2)/(R1-R2)$ is satisfied.

The second writing power calculation means outputs the second writing power by performing the true/false verification through the $\beta$ verification ($\beta$ verification process) Here, the second writing power calculation means may-verify true/false of the second writing power by comparing the $\beta$ value of the writing power set as a target with the $\beta$ value of the writing power output from the second writing power calculation means. It should be noted here that the $\beta$ value is obtained from a formula of $(R1+R2)/(R1-R2)$, in which the maximum value and the minimum value of the signal reproducing the information for the test writing are assumed to be R1 and R2, respectively.

Further, the second calibration means may urge the writing means to write repeatedly for a plurality of times, and calculates the writing power in accordance with the average value obtained therein.

The first writing power calculation means may output the first writing power by performing the true/false verification through the $\beta$ verification. In this case, the first writing, power calculation means may verify true/false of the first writing power by comparing the $\beta$ value of the writing power set as a target with the $\beta$ value of the writing power output from the first writing power calculation means. It should be noted here that the $\beta$ value is obtained from a formula of $(R1+R2)/(R1-R2)$, in which the maximum value and the minimum value of the signal reproducing the information for the test writing are assumed to be R1 and R2, respectively.

As described above, the present invention is capable of determining the optimum writing power to recording media having various recording sensitivity, by using the smallest area in the PCA.

Next, the operation of the power calibration apparatus 10 will be briefly described.

The MPU 28 first instructs the coarse adjustment calibration control circuit 22 to perform a coarse adjustment calibration. The coarse adjustment calibration control circuit 22 instructs the setting power calculation circuit 21 as to the default writing power and the changing amount of a coarse adjustment writing power. Then, the MPU 28 instructs the servo control circuit 27 to seek to the PCA. The servo control circuit 27 controls the spindle motor 25 and the thread motor 26 so as to seek the light pickup 12 to the address in the PCA where the power calibration is performed.

The coarse adjustment calibration control circuit 22 subsequently instructs the encoding EFM count control circuit 20 as to the number of EFM count, and instructs the encoding control circuit 19 to start encoding. Data for writing, which is encoded by the encoding control circuit 19, is written as information for the test writing from the light pickup 12 into the optical disk 11 with the writing power set in the LD control circuit 18 by the setting power calculation circuit 21.

When the writing starts, the encoding EFM count control circuit 20 counts the number of the encoded EFM frames of the data for writing, and informs the coarse adjustment calibration control circuit 22 when the number of frames reaches the designated count number. The coarse adjustment calibration control circuit 22 changes the writing power in the setting power calculation circuit 21.

When writing for the designated number of EFM frames is completed, the servo control circuit 27 again seeks the light pickup 12 to the same address in the PCA. The coarse adjustment calibration control circuit 22 instructs the decoding EFM count control circuit 15 as to the number of EFM count, and instructs the decoding control circuit 14 to decode the reproducing signals from the reproducing signal detection circuit 13.

When reading (decoding) of the information which is test-written in the optical disc starts, the decoding EFM count control circuit 15 counts the number of the EFM frames of the reproduced data decoded, and informs the coarse adjustment calibration control circuit 22 when the number of frames reaches the designated count number. The coarse adjustment calibration control circuit 22 instructs the $\beta$ detection circuit 17 to detect S. Upon detecting $\beta$ corresponding to the designated number of the EFM frames, the optimum writing power is calculated as the first writing power in the optimum power calculation circuit 16. Through the above-described process, the coarse adjustment calibration and the calculation of the first writing power end.

Following the aforementioned process, the MPU 28 instructs the fine adjustment calibration control circuit 23 to perform a fine adjustment calibration. The fine adjustment calibration control circuit 23 sets the first writing power determined in the first writing power calculation process as the initial value, and instructs as to the changing amount of the fine adjustment writing power. The controls of encoding and decoding are the same as that in the coarse adjustment calibration.

When the fine adjustment calibration is completed, the MPU 28 instructs the $\beta$ detection control circuit 24 to perform $\beta$ detection. The $\beta$ detection control circuit 24 instructs as to the optimum power determined in the fine adjustment calibration. Here, the changing amount of the writing power is 0. The controls of encoding and decoding are the same as that in the coarse adjustment calibration and the fine adjustment calibration. Upon detecting $\beta$ corresponding to the designated number of the EFM frames, the average value of the $\beta$ or each $\beta$ value is verified whether it is written with the optimum writing power. Here, the detected β is verified whether it is in the range of the targeted β or not. In a case that the result of the verification is abnormal, the process starting from the coarse adjustment calibration is retried. In a case that the result of the verification is normal, the β verification ends.

At last, the MPU 28 instructs to record one frame of the count area and the process ends.

Figure 3:
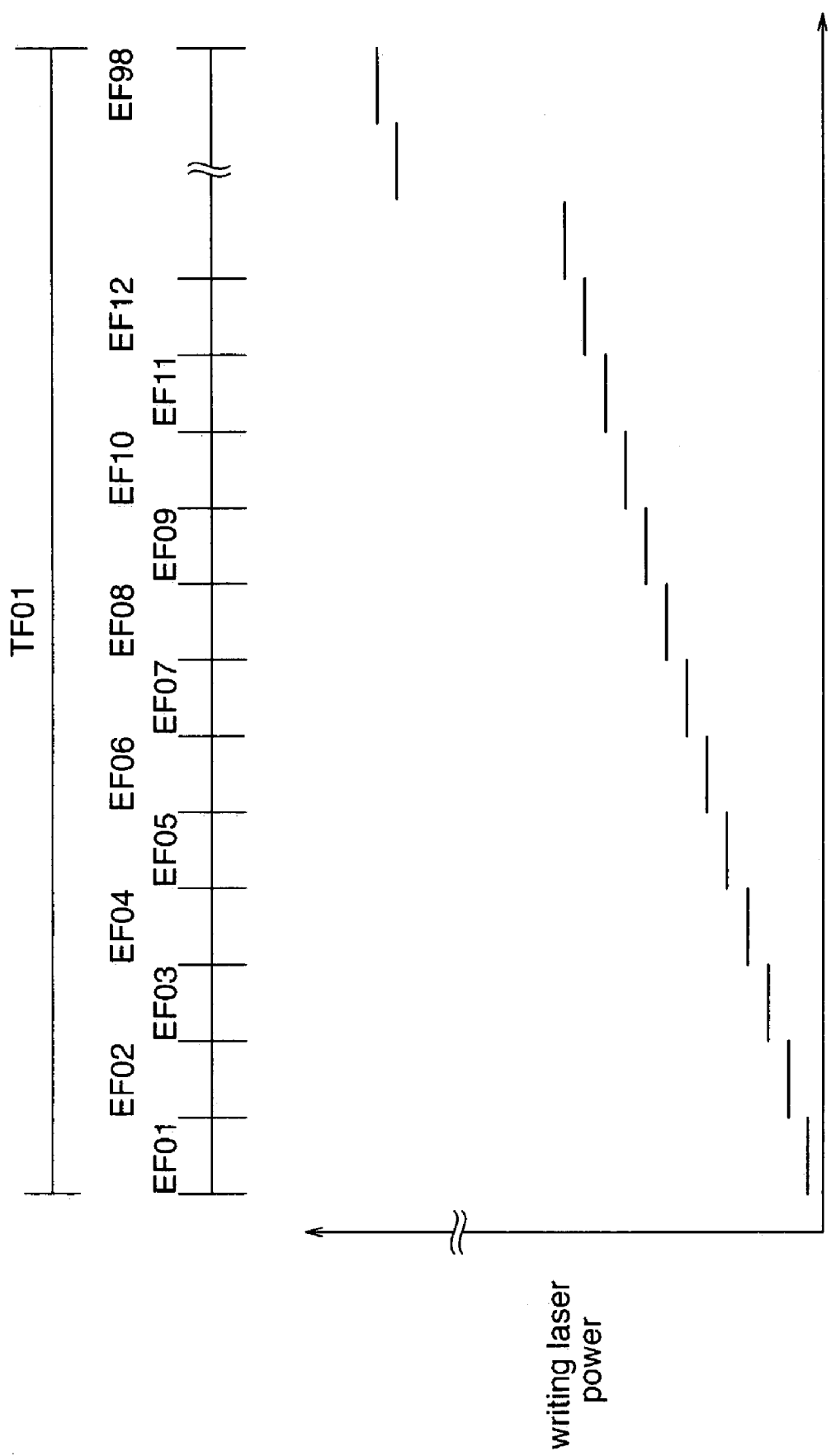
FIG. 3 is a characteristic diagram showing changes in a writing power in a power calibration (a first example) of the power calibration apparatus shown in FIG. 1.

FIG. 3 is a characteristic diagram showing the changes in the writing power in the power calibration (a first example) of the power calibration apparatus 10. An explanation will be given below according to the Figure.

Figure 9:
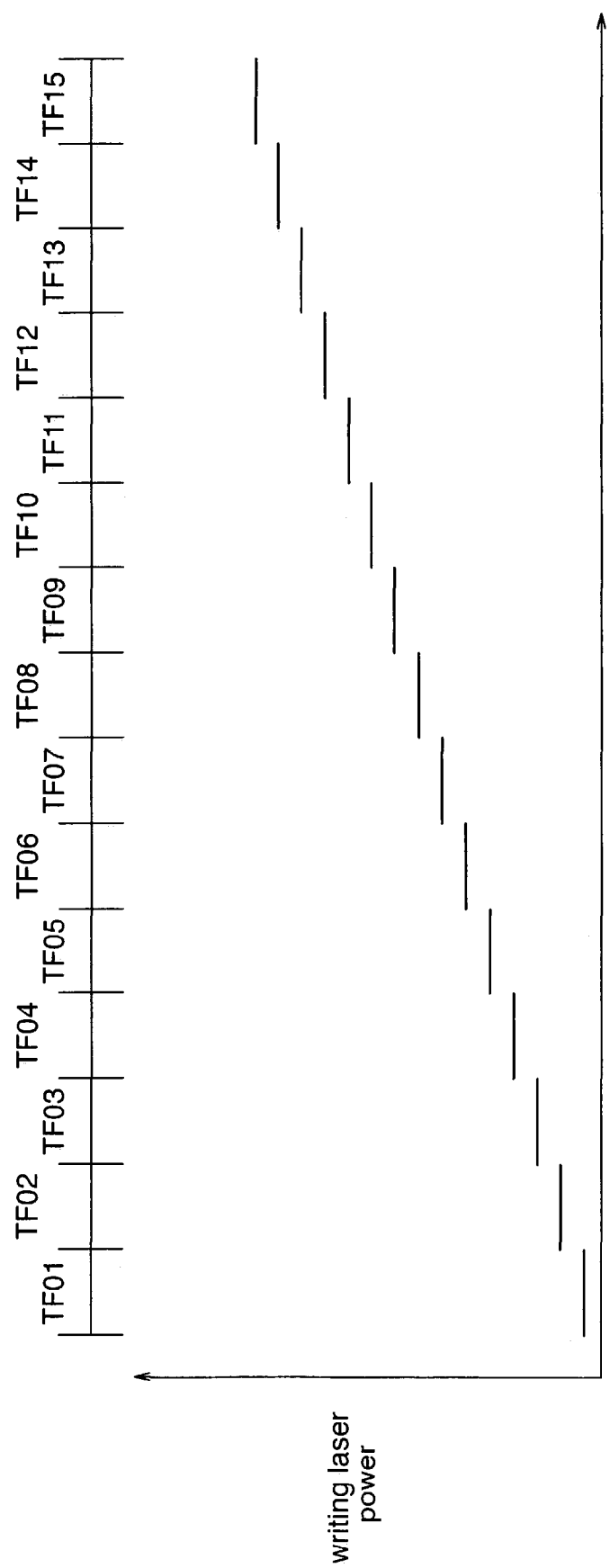
FIG. 9 is a characteristic diagram showing changes in a writing power in a power calibration of the power calibration apparatus shown in FIG. 8.

The smallest unit of the power calibration is one EFM frame. Therefore, in a case of changing the changing amount of the writing power by the densest degree, the writing power may be changed up to ninety-eight steps in one test frame. It should be noted that in the prior art shown in FIG. 9, the writing power is changed only up to fifteen steps since the smallest unit of the power calibration is one test frame.

Figure 4:
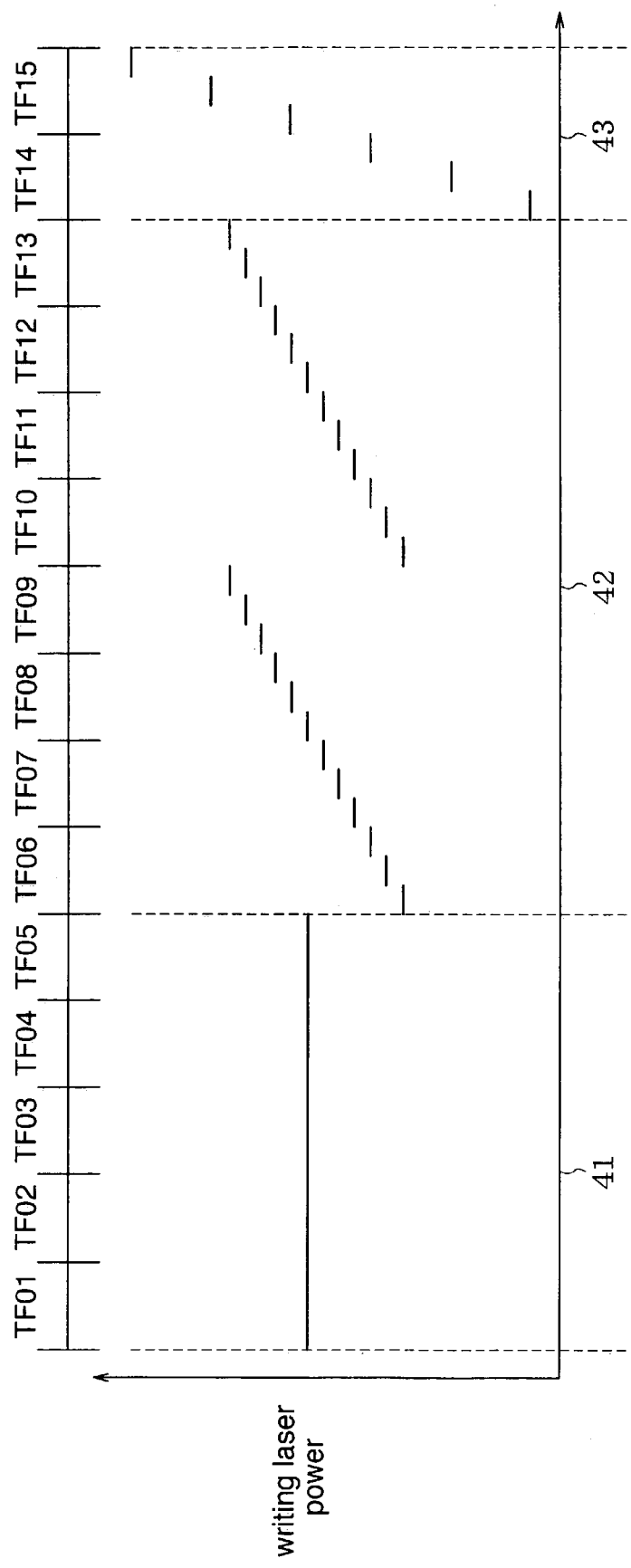
FIG. 4 is a characteristic diagram showing changes in a writing power in a power calibration (a second example) of the power calibration apparatus shown in FIG. 1.
Figure 5:
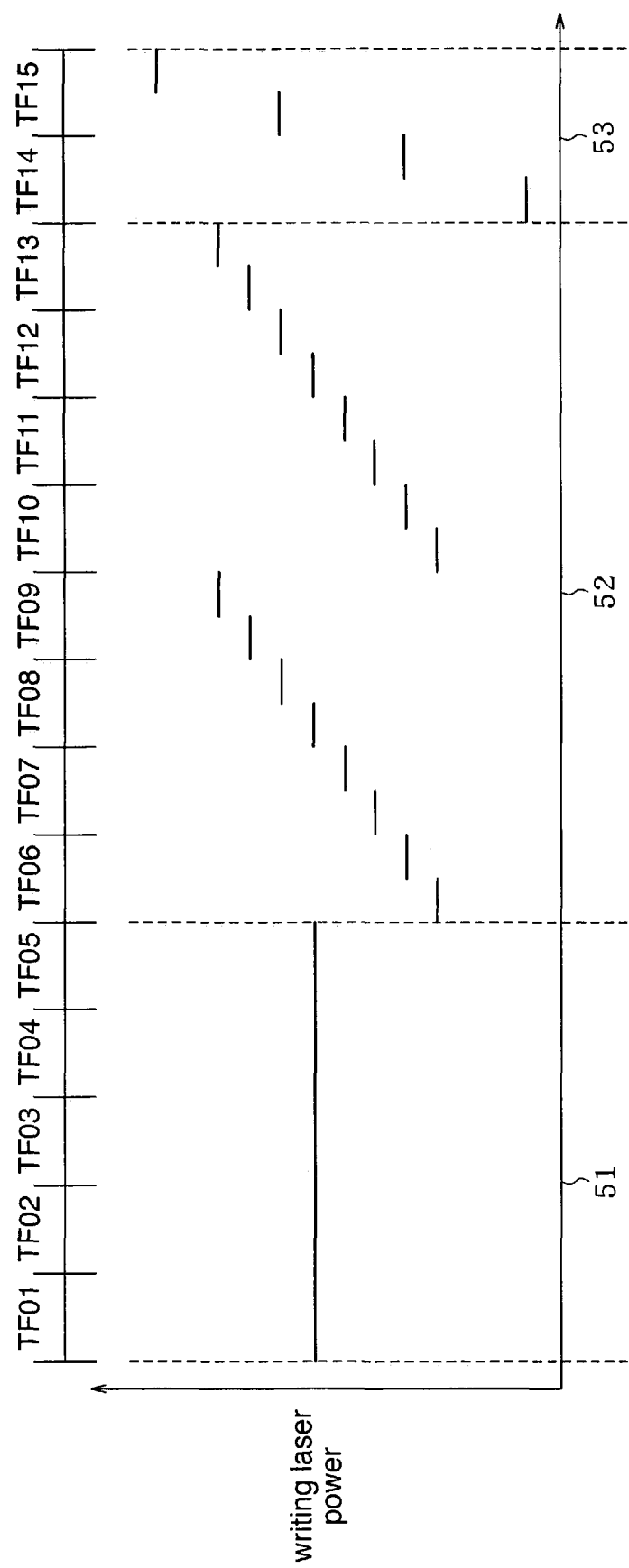
FIG. 5 is a characteristic diagram showing changes in a writing power in a power calibration (a third example) of the power calibration apparatus shown in FIG. 1.

FIGS. 4 and 5 are characteristic diagrams showing the changes in the writing power in the power calibrations (second and third examples) of the power calibration apparatus 10, according to which an explanation will be given below.

In the present invention, the smallest unit of the power calibration may be changed to two EFM frames (that is, forty-nine steps in one test frame), eight EFM frames (that is, twelve steps in one test frame) or the like, depending on the system. FIG. 4 shows the changes in the writing laser power when thirty-two EFM frames are set as the smallest unit (that is, three steps in one test frame). FIG. 5 shows the changes in the writing laser power when forty-nine EFM frames are set as the smallest unit (that is, two steps in one test frame).

FIGS. 6 and 7 are flowcharts showing the operation of the power calibration apparatus 10. An explanation will be given below according to FIGS. 1 to 7.

The MPU 28 first instructs the coarse adjustment calibration control circuit 22 to perform the coarse adjustment calibration to thereby perform a coarse adjustment writing process (step 202). The coarse adjustment calibration control circuit 22 sets, in the setting power calculation circuit 21, the initial value of the first writing power and the changing amount according to which the first writing power is changed in steps (step 204), and sets a coarse adjustment EFM count value in the encoding EFM count control circuit 20 (step 207).

The EFM count value may be set as various values depending on the system. The example in FIG. 5 shows the changes in the writing power in a case where the EFM count value is forty-nine EFM frames (a half test frame). In a case of using a higher-speeded CPU, by setting the EFM count value as thirty-two EFM frames (a third test frame) as shown in the example in FIG. 4, the larger number of β samples can be obtained. Accordingly, the precision of the determined optimum power may be improved. Here, the explanation will be continued according to the example in FIG. 5. In the example in FIG. 5, the changing amount of the first writing power during the coarse adjustment calibration 53 is changed in four steps. Therefore, the degree of the changing amount of the first writing power is set as non-dense. It is preferable that the degree of the changing amount of the first writing power be equal, however it is not always necessary to be equal.

Then, the MPU 28 instructs the servo control circuit 27 to seek the light pickup 12 to the designated address in the PCA 31 (step 210). Upon completion of the seek to the designated address, the initial first writing power and several kinds of the first writing power in which the changing amounts to the initial first writing power are set in steps as non-dense, are set in the setting power calculation circuit 21. An output from the setting power calculation circuit 21 is input into the LD control circuit 18 (see coarse adjustment calibration 53 in FIG. 5), then the encoding control circuit 19 starts test writing (step 211). Data for encoding is written from the light pickup 12 to the optical disk 11., When the test writing starts., the encoding EFM count, control circuit 20 monitors whether the number of EFM frames comes to the designated EFM count (here, forty-nine EFM frames) or not. When the number of EFM frames reaches the designated EFM count, the encoding EFM count control circuit 20 informs the coarse adjustment calibration control circuit 22 (step 212), and the coarse adjustment calibration control circuit 22 changes the writing power in one step (step 213). When changing of the writing power in four steps and encoding for two test frames (TF14 and TF15 in FIG. 5) are completed, the coarse adjustment writing process ends (step 214).

Following the process, a coarse adjustment reading process is performed (step 215). The coarse adjustment calibration control circuit 22 sets a coarse adjustment EFM count value in the decoding EFM count control circuit 15 (step 217). The EFM count value in this process is set as the same value as that in the coarse adjustment writing process. The MPU 28 instructs the servo control circuit 27 to seek the light pickup 12 to the designated address in the PCA 31 (step 220). Upon completion of the seek to the designated address, the reproducing signals are output by the light pickup 12 from the optical disc 11. Thereby, the reproducing signals are input into the decoding control circuit 14 from the reproducing signal detection circuit 13, and decoding of the reproducing signals starts (step 221). When decoding starts, the decoding EFM count control circuit 15 monitors whether the number of EFM frames comes to the designated number of the EFM counts (here, forty-nine EFM frames) or not. Through the above process, the first calibration step ends.

When the number of EFM frames reaches the designated number of the EFM counts, the decoding EFM count control circuit 15 informs the coarse adjustment calibration control circuit 22 (step 222), and the β detection circuit 17 calculates β (step 223). β is calculated by the equation of $\beta=(R1+R2)/(R1-R2)$, using the maximum value R1 and the minimum value R2 of the reproducing signals. When β in the four steps are detected, decoding ends (step 224), and the optimum power calculation circuit 16 determines the optimum power (steps 225 and 227). The optimum power is calculated using two coarse adjustment β close to the targeted β decided beforehand, by a straight line approximation. As the targeted β, β which is obtained by measuring the optical disc recorded with the optimum power using the β measuring instrument having such trade name as "CD-Cat's", "DVD-Cat's" and the like, is used. Through the above process, the first writing power calculation ends (step 228).

Following the process, the first writing power calculated in the first writing power calculation is set as the initial value, and using the first writing power as the basis, a fine adjustment calibration is performed. The MPU 28 instructs the fine adjustment calibration control circuit 23 to perform the fine adjustment calibration to perform a fine adjustment writing process (step 203). The fine adjustment calibration control circuit 23 sets in the setting power calculation circuit 21, the writing power determined in the coarse adjustment calibration and the changing amount of the fine adjustment writing power (step 205).

Then, the fine adjustment calibration control circuit 23 sets a fine adjustment EFM count value in the encoding EFM count control circuit 20 (step 208). In the example in FIG. 5, the second writing power used for the fine adjustment calibration 52 is changed by a dense degree through steps equal to eight steps multiplied by two. By setting the degree of the changing amount of the second writing power smaller (denser) than that in the coarse adjustment calibration, the optimum power is determined in more focused manner than in the coarse adjustment calibration. It should be noted here that the proportion of changing the second writing power is not necessary to be equal, and it is possible to change the proportion depending on a case. Further, in some CD-Rs, there may be a rare case that the sensitivity fluctuation in the periphery is large. Around the PCA in a CD-R, there are about eight frames in the periphery. In the example in FIG. 5., a process in which the writing power is changed in eight steps (four frames) is repeated twice, and by averaging them, the effects of the sensitivity fluctuation in the periphery may be canceled. The process from the seek to the start of encoding is the same as that in the coarse adjustment writing process (steps 210 to 213). When the writing power is changed in the steps equal to eight steps multiplied by two and encoding of the eight frames are completed, the fine adjustment writing process ends (step 214).

Following the process, a fine adjustment reading process is performed (step 216). The fine adjustment calibration control circuit 23 sets the fine adjustment EFM count value in the decoding EFM count control circuit 15 (step 218) Here, the EFM count value is the same vale as that in the coarse adjustment writing process. The process from the seek to the start of decoding is the same as that in the coarse adjustment reading process (steps 220 to 223). When $\beta$ values in the steps equal to eight steps multiplied by two are detected, decoding ends (step 224), and the optimum power calculation circuit 16 calculates, among sixteen $\beta$ values, an average between $\beta$ values corresponding to each writing power so as to obtain eight $\beta$ values. In accordance with the values, the optimum power is determined in the same manner as the coarse adjustment calibration (steps 225 and 227). Through the aforementioned process, the fine adjustment reading process (the second calibration step) ends (step 228).

Next, the $\beta$ verification is performed using the optimum power obtained in the fine adjustment calibration so as to verify whether the optimum power is really the optimum. The MPU 28 instructs the $\beta$ verification control circuit 24 to perform the $\beta$ verification so that the $\beta$ verification writing process is performed. The $\beta$ verification control circuit 24 sets the second writing power determined in the fine adjustment calibration, in the power calculation circuit 21 (step 206). It should be noted here that the writing power is not changed in the $\beta$ verification so that the changing amount of the writing power is not set. Through the aforementioned process, the second writing power calculation ends.

Next, the $\beta$ verification control circuit 24 sets a $\beta$ verification EFM count value in the encoding EFM count control circuit 20 (step 209). In the $\beta$ verification 51 of the example in FIG. 5, the writing power is not changed but the recording unit is set in ten steps. The process from the seek to the start of encoding is the same as that in the coarse adjustment writing process and the fine adjustment writing process (steps 210 to. 213). Upon completion of encoding of the five test frames, the $\beta$ verification writing process ends (step 214).

Then, the $\beta$ verification reading process is performed. The $\beta$ verification control circuit 24 sets the verification EFM count value in the decoding EFM count control circuit 15 (step 219). Here, the EFM count value is set as same as that in the $\beta$ verification writing process. The process from the seek to the start of decoding is the same as that in the coarse adjustment reading process and the fine adjustment reading process (steps 220 to 223). Upon detecting $\beta$ values in ten steps, decoding ends (step 224), and the $\beta$ verification control circuit 24 verifies whether the average of the $\beta$ values is within the acceptable range around the targeted $\beta$ (steps 225 and 226). In a case where the average is not in the range, the process starting from the step 201 is retried in the next PCA. Through the aforementioned process, the $\beta$ verification ends.

Upon completion of the $\beta$ verification, the calibration process ends (step 228). At last, one frame of the count area in the PCA is recorded (step 229) and the process is completed (step 230).

Now, the present invention will be summarized below. First, the coarse adjustment calibration control circuit 22 determines the rough writing power by changing the writing power by a non-dense degree. Then, using the writing power determined in the coarse adjustment calibration, the fine adjustment calibration control circuit 23 determines the optimum power through changing the power by a denser degree. The $\beta$ verification control circuit 24 verifies whether the optimum power determined in the fine adjustment calibration is the optimum. The changes in the writing power in each process and the $\beta$ detection are performed by the encoding EFM count control circuit 20 and the decoding EFM count control circuit 15 using an EFM frame, which is obtained by dividing one frame into ninety-eight frames, as the smallest unit. Through these processes, the changing point of the writing power and the number of samples of the detected $\beta$ are increased, so that the precision of the power calibration is improved. Accordingly, in the present invention, the optimum power is determined through the power calibration with high precision, not using a plurality of PCAs but using only the smallest area.

In the present invention as described above, an area used for one power calibration is divided into many smallest units for test writing, which enables to perform the coarse adjustment calibration and the fine adjustment calibration. Therefore, the present invention is capable of determining the optimum power with high precision.

Further, the present invention is capable of performing the coarse adjustment calibration, the fine adjustment calibration and the verification process, so that the optimum power is determined with high precision.

In other words, a first effect of the present invention is to achieve such complicated power calibration methods as a coarse adjustment calibration, a fine adjustment calibration and a $\beta$ verification, by further dividing one test frame, which is the smallest unit for changing the writing power in the prior art. That is to say, the complicated power calibration can be achieved in the smallest area, without using a plurality of areas in PCAs.

A second effect of the present invention is, by determining the rough writing power in the coarse adjustment calibration, and through changing, in the fine adjustment calibration, the writing power by a denser degree based on the writing power determined in the coarse adjustment calibration, the optimum power for an optical disc with any recording sensitivity can be determined. Moreover, by verifying whether the determined optimum power is really the targeted writing power, the power calibration with considerable high precision can be achieved.

What is claimed is:

1. A power calibration apparatus for an optical disc comprising:
   writing means for writing information for a test writing by emitting a laser light to a power calibration area on an optical disc;
   reading means for reading the information for the test writing written in the optical disc;
   a first calibration means for controlling writing by the writing means through changing in steps a writing power of the laser light for writing the information for the test writing, setting a stepwise changing amount to a non-dense degree, and identifying a calibration area which, among calibration areas divided by a non-dense unit on the optical disc, is divided by a dense unit instead of the non-dense unit;
   a first writing power calculation means for reading the information for the test writing written in the optical disc under the control of the first calibration means, and calculating a first writing power in accordance with read out information for the test writing;
   a second calibration means for setting, to the writing power of the laser light for writing the information for the test writing, the first writing power as an initial value, and by changing the first writing power by a dense degree through steps corresponding in number to that of the calibration areas divided by the dense unit, urging the writing means to write corresponding to the steps in number; and
   a second writing power calculation means for reading the information for the test writing written in the optical disc under the control of the second calibration means, and calculating a second writing power in accordance with the information for the test writing of a sample number corresponding to the number of the calibration areas.

2. The power calibration apparatus for an optical disc as claimed in claim 1, wherein the non-dense unit is an Atip unit and the dense unit is an EFM frame unit.

3. The power calibration apparatus for an optical disc as claimed in claim 1, wherein the first writing power calculation means and the second writing power calculation means satisfy an equation of $\beta=(R1+R2)/(R1-R2)$, in which a maximum value and a minimum value of signals reproducing the information for the test writing are assumed to be R1 and R2, respectively, and the writing power is calculated in accordance with a $\beta$ value.

4. The power calibration apparatus for an optical disc as claimed in claim 1, wherein the second writing power calculation means outputs the second writing power by performing a true/false verification through a $\beta$ verification process.

5. The power calibration apparatus for an optical disc as claimed in claim 4, wherein the second writing power calculation means verifies true/false of the second writing power by comparing a $\beta$ value of a writing power set as a target with a $\beta$ value of an actually measured writing power, and the $\beta$ value is obtained from a formula of $(R1+R2)/(R1-R2)$, in which a maximum value and a minimum value of a signal reproducing the information for the test writing are assumed to be R1 and R2, respectively.

6. The power calibration apparatus for an optical disc as claimed in claim 1, wherein the second calibration means urges the writing means to write repeatedly for a plurality of times, and in accordance with an average value obtained therein, the second power calculation means calculates the second writing power.

7. The power calibration apparatus for an optical disc as claimed in claim 1, wherein the first writing power calculation means outputs the first writing power by performing a true/false verification through a $\beta$ verification process.

8. The power calibration apparatus for an optical disc as claimed in claim 7, wherein the first writing power calculation means verifies true/false of the first writing power by comparing a $\beta$ value of a writing power set as a target with a $\beta$ value of an actually measured writing power, and the $\beta$ value is obtained from a formula of $(R1+R2)/(R1-R2)$, in which a maximum value and a minimum value of a signal reproducing the information for the test writing are assumed to be R1 and R2, respectively.

9. A power calibration method for an optical disc comprising:
   a step of first calibration which changes a writing power of a laser light for writing information for a test writing in steps, sets a stepwise changing amount to a non-dense degree, identifies a calibration area which, among calibration areas divided by a non-dense unit on the optical disc, is divided by a dense unit instead of the non-dense unit, and controls writing with the writing power;
   a step of calculating a first writing power, which reads the information for the test writing written in the optical disc and calculates the first writing power in accordance with read out information for the test writing;
   a step of second calibration which sets, to the writing power of the laser light for writing the information for the test writing into the optical disc, the first writing power as an initial value, and by changing the first writing power by a dense degree through steps corresponding in number to that of the calibration areas divided by the dense unit, urges to write with the first writing power corresponding, to the steps in number;
   a step of calculating a second writing power, which reads the information for the test writing written in the optical disc with the first writing power, and calculates the second writing power in accordance with the information for the test writing of a sample number corresponding to the number of the calibration areas; and
   a step of verifying true/false of the second writing power through performing the test writing into the optical disc with the second writing power and reading the test writing written with the second writing power.

10. The power calibration method for an optical disc as claimed in claim 9, wherein the non-dense unit is an Atip unit and the dense unit is an EFM frame unit.

11. The power calibration method for an optical disc as claimed in claim 9, wherein in the first writing power calculation step and the second writing power calculation step, an equation of $\beta=(R1+R2)/(R1-R2)$ is satisfied, in which a maximum value and a minimum value of signals reproducing the information for the test writing are assumed to be R1 and R2, respectively, and the writing power is calculated in accordance with a $\beta$ value.

12. The power calibration method for an optical disc as claimed in claim 9, wherein in the second writing power calculation step, the second writing power is output by performing a true/false verification through a $\beta$ verification process.

13. The power calibration method for an optical disc as claimed in claim 12, wherein in the second writing power calculation step, true/false of the second writing power is verified by comparing a $\beta$ value of a writing power set as a target with a $\beta$ value of the second writing power output in the second writing power calculation step, and the $\beta$ value is obtained from a formula of (R1+R2)/(R1−R2), in which a maximum value and a minimum value of a signal reproducing the information for the test writing are assumed to be R1 and R2, respectively.

14. A power calibration method for an optical disc comprising:
- a step of first calibration which changes a writing power of a laser light for writing information for a test writing in steps, sets a stepwise changing amount to a non-dense degree, identifies a calibration area which, among calibration areas divided by a non-dense unit on the optical disc, is divided by a dense unit instead of the non-dense unit, and controls writing with the writing power;
- a step of calculating a first writing power, which reads the information for the test writing written in the optical disc and calculates the first writing power in accordance with read out information for the test writing;
- a step of verifying true/false of the first writing power through performing the test writing into the optical disc with the first writing power and reading the test writing written in the optical disc;
- a step of second calibration which sets, to the writing power of the laser light for writing the information for the test writing into the optical disc, the first writing power verified as true in the step of verifying as an initial value, and by changing the first writing power by a dense degree through steps corresponding in number to that of the calibration areas divided by the dense unit, urges to write with the first writing power corresponding to the steps in number;
- a step of calculating a second writing power, which reads the information for the test writing written in the optical disc with the first writing power, and calculates the second writing power in accordance with the information for the test writing of a sample number corresponding to the number of the calibration areas; and
- a step of verifying true/false of the second writing power through performing the test writing into the optical disc with the second writing power and reading the test writing.

15. The power calibration method for an optical disc as claimed in claim 14, wherein the non-dense unit is an Atip unit and the dense unit is an EFM frame unit.

16. The power calibration method for an optical disc as claimed in claim 14, wherein in the first writing power calculation step and the second writing power calculation step, an equation of $\beta=(R1+R2)/(R1-R2)$ is satisfied, in which a maximum value and a minimum value of signals reproducing the information for the test writing are assumed to be R1 and R2, respectively, and the writing power is calculated in accordance with a $\beta$ value.

17. The power calibration method for an optical disc as claimed in claim 14, wherein in the second writing power calculation step, the second writing power is output by performing a true/false verification through a $\beta$ verification process.

18. The power calibration method for an optical disc as claimed in claim 17, wherein in the second writing power calculation step, true/false of the second writing power is verified by comparing a $\beta$ value of a writing power set as a target with a $\beta$ value of the second writing power output in the second writing power calculation step, and the $\beta$ value is obtained from a formula of (R1+R2)/(R1−R2), in which a maximum value and a minimum value of a signal reproducing the information for the test writing are assumed to be R1 and R2, respectively.

19. The power calibration method for an optical disc as claimed in claim 14, wherein writing is performed repeatedly for a plurality of times in the second calibration step, and in accordance with an average value obtained therein, the second writing power is calculated in the second writing power calculation step.

20. The power calibration method for an optical disc as claimed in claim 14, wherein in the first writing power calculation step, the first writing power is output by performing a true/false verification through a $\beta$ verification process.

21. The power calibration method for an optical disc as claimed in claim 14, wherein in the first writing power calculation step, true/false of the first writing power is verified by comparing a $\beta$ value of a writing power set as a target with a $\beta$ value of the first writing power output in the first writing power calculation step, and the $\beta$ value is obtained from a formula of (R1+R2)/(R1−R2), in which a maximum value and a minimum value of a signal reproducing the information for the test writing are assumed to be R1 and R2, respectively.

* * * * *